Nov. 26, 1957 K. J. FREDERICKS 2,814,145
REVERSIBLE NET ROLLER FOR FISHING BOATS
Filed April 9, 1956 2 Sheets-Sheet 1
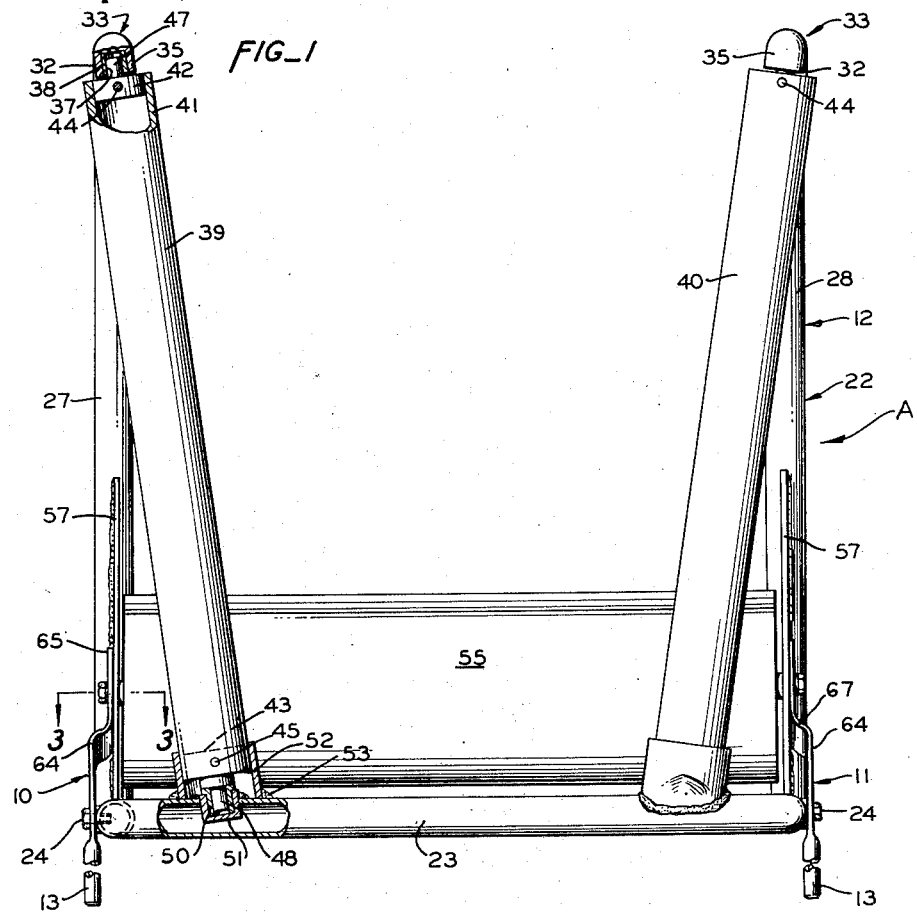
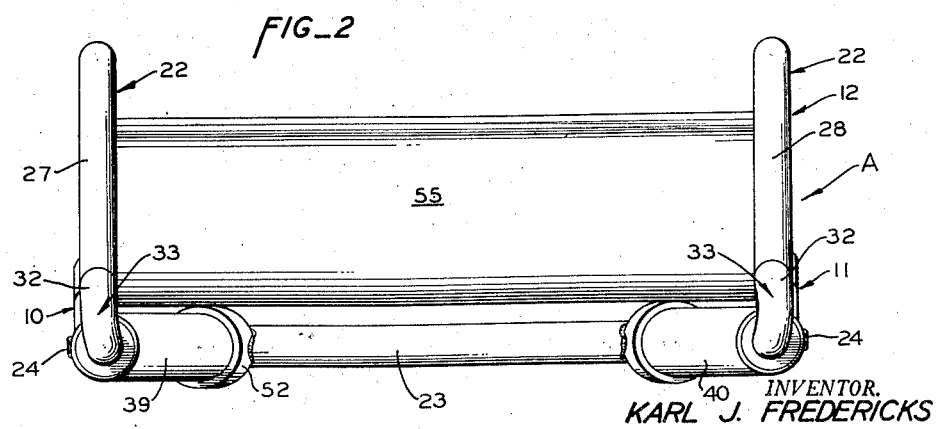
INVENTOR.
KARL J. FREDERICKS
BY
Hansen and Lane
ATTORNEYS

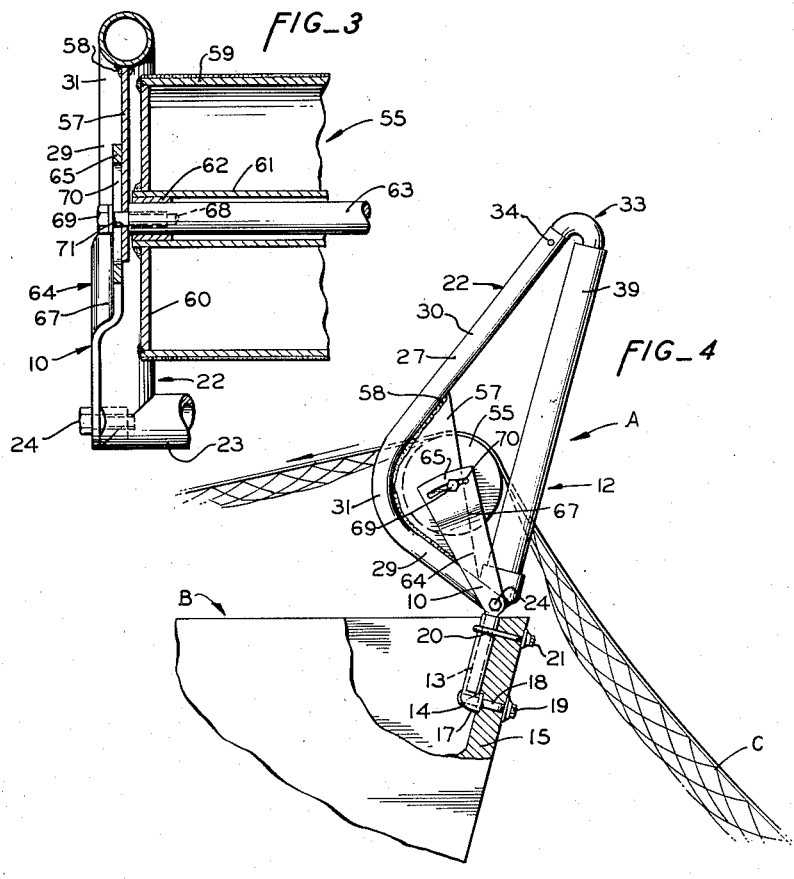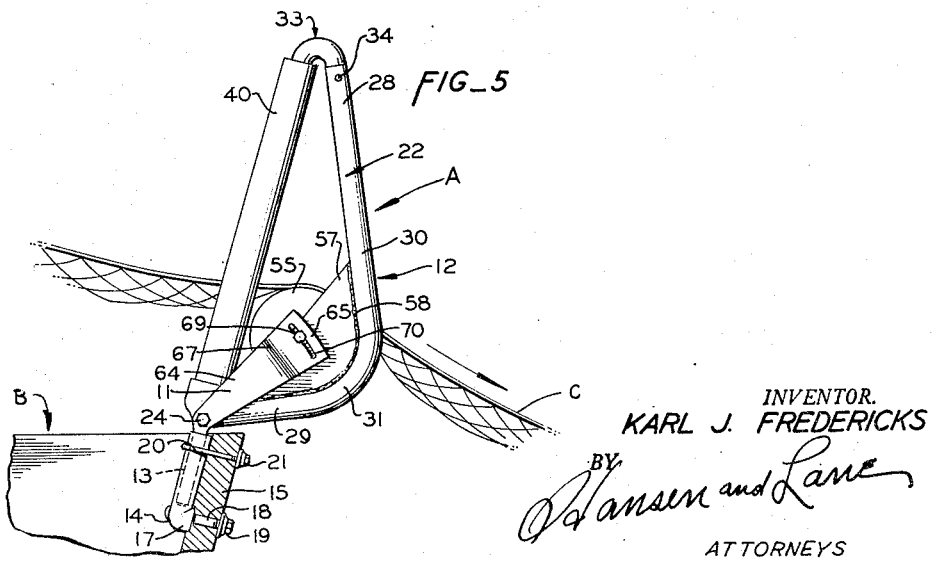

2,814,145

REVERSIBLE NET ROLLER FOR FISHING BOATS

Karl J. Fredericks, Campbell, Calif.

Application April 9, 1956, Serial No. 577,035

9 Claims. (Cl. 43—8)

The present invention relates to a net handling device, and pertains more particularly to a roller arrangement for removably mounting on the stern of the fishing boat to facilitate the handling of nets in passing them out or drawing them in over the transom of such boat.

In some types of fishing, particularly the gill netting of salmon in Alaskan waters, it is customary to use a long gill net which is put out or taken in, in relatively shoal water, either off the coast or in the mouths of rivers and streams along the coast. This fishing is usually done either from motor trollers or from row boats.

In passing the net out over the stern of the boat, or in bringing it in with fish therein, the net is subjected to a great deal of wear and danger of snagging as it is passed back and forth across the transom of the boat. In the past, attempts have been made to provide rollers which would facilitate handling these nets, but such prior devices have not been considered suitable for use in the type of fishing practiced in Alaskan coastal waters.

The present invention contemplates the provision of an improved net roller arrangement for mounting on fishing boats to facilitate the passing out and drawing in of nets over the stern of the boat.

The invention also provides a reversibly mounted net handling roller mechanism for mounting on the stern of a boat, and one which is adjustable to various angles for mounting the mechanism on transoms of different slopes.

Another object of the invention is to provide an improved and simplified, floating, metal, net handling roller arrangement for mounting on the transom of a small boat for passing nets in and out over the transom.

These and other objects and advantages of the invention will be apparent from the following description and the accompanying drawings, wherein:

Fig. 1 is a rear elevational view of the device as it appears when mounted for drawing the net inwardly over the stern of the boat, portions thereof being broken away.

Fig. 2 is a plan view of the arrangement shown in Fig. 1.

Fig. 3 is an enlarged, fragmentary sectional view taken along line 3—3 of Fig. 1.

Fig. 4 is a side elevational view in reduced scale showing the device of Fig. 1 mounted on the transom of a boat for bringing a net into the boat, portions being broken away.

Fig. 5 is a view similar to Fig. 4, showing the device reversed for passing the net out.

Briefly, a net roller device A, an illustrative embodiment of the invention, comprises a pair of similar, but reversed, support members 10 and 11 mounted on opposite sides of a tiltably adjustable roller assembly 12. A rod portion 13 is formed integrally on the lower end of each support member 10 and 11, and is adapted to fit into one of a pair of support sockets 14 mounted in generally upright, axially parallel relation on the transom 15 of a fishing boat B to facilitate passing a net C outwardly or inwardly over the transom 15.

Referring to the details of the illustrated embodiment A of the invention, the mounting sockets 14 preferably are castings, either of bronze or galvanized iron. Each socket 14 preferably has a mounting pad 17 formed on its lower end, and is secured to the transom 15 by a bolt 18 inserted through holes provided therefor in the pad 17 and through the boat transom 15. The sockets 14 are mounted upright and parallel to each other on the transom 15. They are spaced apart to receive the rod portions 13 of the stationary support members 10 and 11 therein, thereby to mount the roller assembly 12 in either of two relatively reversed positions as shown in Figs. 4 and 5, respectively.

A nut 19, which preferably is an acorn nut so as to reduce the probability of its snagging the net C, is screwed onto the threaded outer end of each bolt 18 to secure the sockets 14 to the transom. A hook bolt 20 also with an acorn nut 21 screwed thereon secures the upper end of each socket 14 to the transom. The rod portions 13 of the support members 10 and 11 are of a size to fit freely, but without apreciable wobble movement, into the transom mounted sockets 14.

The tiltable roller assembly 12 comprises a generally U-shaped tubular frame member 22 having a straight transverse portion 23 extending substantially coaxially between a pair of pivot screws 24 which are inserted through holes provided therefor in the support members 10 and 11. The side legs 27 and 28 of this U-shaped frame member 22 are similar to each other and extend upwardly at right angles to the transverse frame portion 23. Each side leg 27 and 28 is bent to generally L-shape (Figs. 4 and 5) with straight portions 29 and 30 joined by a curved intermediate portion 31.

One leg 32 of an inverted U-shaped top frame member 33 is mounted in sealing relation coaxially in the upper end of each side leg 27 and 28 of the U-shaped frame member 22, and is secured therein by a rivet 34. The downwardly extending free leg 35 of each inverted U-shaped top frame member 33 has a socket 37 formed coaxially therein (Fig. 1) and is twisted slightly from said one leg 32 so that the axis of the socket 37 is inclined inwardly from the side leg 27 or 28 in which said one leg 32 is mounted.

A bearing bushing 38 is mounted in each socket 37 to provide journal support for the upper end of one of a pair of inclined guide rollers 39 and 40. The inclined rollers 39 and 40 preferably comprise a shell 41 of aluminum tubing with plugs 42 and 43 fitted in close, sealing relation in the upper and lower ends, respectively, thereof. The plugs 42 and 43 are secured in position in the shell 41 by rivets 44 and 45, respectively. End bearing studs 47 and 48 are provided coaxially on each of the end plugs 42 and 43, respectively, and are journaled in the bearing bushings 38. The lower end stud 48 of each of the inclined rollers 39 and 40 is journaled in a bearing bushing 50 fitted into a cup-shaped member 51 which in turn is welded in sealed relation into a hole provided therefor in the transverse portion 23 of the U-shaped frame member 22.

Surrounding the lower end of each of the inclined rollers 39 and 40 is a guard sleeve 52 which is welded at 53 to the transverse frame portion 23 and prevents the net C from becoming entangled at the lower ends of the upright rollers.

For mounting a larger diameter main horizontal roller 55 a gusset plate 57 is welded at 58 within the curved portion 31 of each side leg 27 and 28 of the U-shaped frame member 22. Each gusset plate 57 extends inwardly into the space between the straight portions 29 and 30 of each side leg 27 and 28 along the plane defined by the axes of these straight leg portions.

The main, net supporting roller 55 comprises an outer tubular shell portion 59, preferably of aluminum, with end plates 60 welded in sealed relation one in each end thereof. A center tube 61 is mounted co-axially within the tubular shell 59 and is welded in sealed relation in a central hole provided therefor in each end plate 60. The center tube 61 extends the entire length of the roller. A bearing bushing 62 is fitted into each end of the center tube 61, and these bushings are journaled on an axle 63 of slightly greater length than the tubular roller portions 59 and 61.

Each support member 10 and 11 has a segmental plate top portion 64 formed integrally on each rod portion 13, and the upper end portion 65 (Fig. 3) of each segmental plate portion 64 is offset inwardly at 67 to fit closely against the gusset plate 57 adjacent thereto. The axle 63 is of a length to fit between the two gusset plates 57. A threaded axial hole 68 (Fig. 3) is provided in each end of the axle 63, and a machine screw 69 is inserted through the slotted arcuate opening 70 in each segmental plate portion 64, through a hole 71 provided therefor in the gusset plate 57 inwardly adjacent thereto, and is threaded into the axial hole 68 in each end of the axle 63 to frictionally bind the gusset plates 57 and segmental portions 64 firmly to each other, to the screws 69, and to the ends of the axle 63.

The larger diameter main roller 55 preferably has a radius slightly less than that of the curved portions 31 of the side frame portions 27 and 28 so as to fit freely therein as indicated in Figs. 3, 4 and 5.

By making the device A substantially entirely of aluminum, the sealed, hollow tubular U-shaped frame member 22, and the sealed hollow rollers 39, 40 and 55 trap sufficient air to give the entire assembly a total weight less than its displacement of water, so that it will float if accidentally dropped overboard.

In installing the device A in a boat, the supporting sockets 14 preferably are first fitted onto the rod portions 13 of the support members 10 and 11 to position the sockets in properly spaced parallel relation, and the sockets then mounted on the transom 15 by means of the lower bolts 18 and hook bolts 20 as shown in Figs. 4 and 5. Thereafter the device A may be mounted on or dismounted from the transom by inserting the rod portions 13 into the sockets 14 or withdrawing them therefrom.

When the net C is to be run out from the boat B as indicated by the arrow in Fig. 5, the device A is mounted with the large horizontal main roller 55 outwardly of the inclined rollers 39 and 40 so that the latter rollers will guide the outgoing net toward a centered position on the larger roller 55. In drawing the net in as indicated by the arrow in Fig. 4, the position of the device A on the transom is reversed by withdrawing the rod portions 13 from their sockets, turning the roller device end for end 180° and then re-inserting the rod portions 13 in the position of Fig. 4, so that the inclined rollers 39 and 40 will still guide the net toward a centered position over the horizontal main roller 55 and will not interfere with its passage into the boat B.

The entire U-shaped roller assembly 12, including the frame member 22 with the rollers 39, 40 and 55 mounted thereon, may be tilted forwardly or rearwardly to a desired position of adjustment relative to the support members 10 and 11 by loosening the two axle screws 69 and the two lower pivot screws 24.

With the screws 24 and 69 thus loosened, the roller frame assembly 12 may be tilted forwardly or rearwardly about the aligned pivot screws 24 to a desired adjusted position, and may be secured in such adjusted position by again tightening the axle screws 69 and pivot screws 24.

The device comprises a simple and easily manipulated net roller which may be easily mounted on any small or medium sized power or rowboat and will prevent damage to the nets while at the same time greatly facilitating its handling. The device is light enough to permit it to be easily handled by one man and in the event that it should accidentally be dropped overboard it will float and therefore may be easily recovered.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A net roller for mounting on the stern of a small boat comprising a pair of support members for mounting in upright, parallel, laterally spaced relation on the stern of such boat, each of said support members comprising a rod-like lower portion and a segmental plate upper portion, each of said upper portions having an arcuate slot therein, and a roller assembly pivotally supported on the support members and extending therebetween, the axis of a pivotal support of said roller assembly being concentric with the arcuate slots in the support members, said roller assembly comprising a U-shaped frame, each side of said frame being L-shaped and disposed in a fore and aft plane, a pair of upwardly divergent, inclined guide rollers journaled between the upper end of each side of the U-shaped frame and the lower side of the frame, a gusset plate mounted in the space between the sides of each L-shaped side of the U-frame and in a plane defined by the axes of said sides, a net supporting roller of larger diameter than the inclined guide rollers journaled coaxially with the holes in the gusset plates, and means extending through the arcuate slots in the segmental portions of the support members and through the holes in the gusset plates for clamping each gusset plate to the segmental portion of a support member, thereby securing the roller assembly against relative pivotal movement to the support members to lock the roller assembly in tiltably adjusted position.

2. A net roller for mounting on the stern of a small boat comprising a pair of support members, means for fixedly mounting said support members in upright, parallel, laterally spaced relation on the stern of such boat, each of said support members having an arcuate slot therein, and a roller assembly pivotally supported on the support members and extending therebetween, the axis of pivotal support of the roller assembly being concentric with the arcuate slots in the support members, said roller assembly comprising a U-shaped frame, a pair of upwardly divergent, inclined guide rollers journalled between the upper end of each side of the U-shaped frame and the lower side of the frame, a roller support plate mounted on each side of the U-shaped frame and in a plane perpendicular to the axis of the pivotal support of the U-shaped frame, each roller support plate having a hole therein, the holes in said support plates being located axially opposite each other and at the same distance from the axis of pivotal mounting of the U-shaped frame as the arcuate slots in the support members, a net supporting roller of larger diameter than the inclined guide rollers journaled coaxially with the holes in the roller support plates, and means extending through the arcuate slots in the support members and through the holes in the roller support plates for clamping each latter plate to the fixed support member, thereby securing the roller assembly against relative pivotal movement to the support members to lock the roller assembly in tiltably adjusted position.

3. A net roller for mounting on the stern of a small boat comprising a support for fixedly mounting on the stern of such boat, and a roller assembly pivotally supported for fore-and-aft tilting movement on the support, said roller assembly comprising a U-shaped frame, each side of said frame being L-shaped and disposed in a fore and aft plane, a pair of upwardly divergent inclined guide rollers journaled between the upper end of each side leg of the U-shaped frame and the transverse bottom portion of the frame, a roller support member mounted in the angle of each L-shaped side leg of the roller frame, a net supporting roller of larger diameter than the inclined guide rollers journaled between said roller support members, and means for clamping each side leg of the U-shaped frame to the fixed support member, thereby securely locking the roller assembly in adjusted tilted relation on the support.

4. An arrangement according to claim 3 and a protective socket closely surrounding the lower end of each guide roller and fixedly secured to said frame.

5. A net roller for mounting on the stern of a small boat comprising support means for selective mounting in either of two relatively reversed positions on the stern of such boat, a pair of fixed side plates on said support means, and a roller assembly pivotally supported on the support means between the fixed side plates, said roller assembly comprising a U-shaped frame, each side of said frame being L-shaped and disposed in a fore and aft plane, a pair of upwardly divergent guide rollers journalled in laterally spaced relation between the upper end of each side of the U-shaped frame and a lower portion of the frame, a gusset plate mounted in the angle of each L-shaped side of the roller frame adjacent a fixed side plate, a roller axle fitted between the gusset plates and extending parallel to the bottom portion of said U-shaped frame, a net supporting roller of larger diameter than the inclined guide rollers journaled on said axle in longitudinally offset relation to the guide rollers, and means for clamping each fixed side plate to the gusset plate adjacent thereto and to an end of the axle, thereby securing the roller assembly in tiltably adjusted position on the support means.

6. A net roller device for mounting on the stern of a small boat comprising a U-shaped roller frame for guiding a fish net into and out of a boat, each side of said frame being L-shaped and disposed in a fore and aft plane, a pair of upwardly divergent guide rollers journalled in laterally spaced relation between the upper end of each side of the U-shaped frame and the transverse lower portion of the frame, a gusset plate mounted in the angle of each L-shaped side of the roller frame, a net supporting roller of larger diameter than the inclined guide rollers journaled between said gusset plates in longitudinally offset relation to the guide rollers, and means for mounting the device on the stern of such boat in either of two relatively reversed positions, one of said positions being with the larger net supporting roller inboard of the guide rollers, and the other position being with the larger roller outboard of the guide rollers.

7. An arrangement according to claim 6 wherein the U-shaped frame, the guide rollers and the larger roller are of sealed hollow tubular construction so as to provide flotation effect when the device is dropped overboard.

8. A net roller for mounting on the stern of a boat comprising a pair of sockets adapted to be mounted in upright, parallel relation on the transom of such boat, a pair of supports inserted selectively, one in either of said sockets, each support having an arcuately slotted hole therein, and a U-shaped roller frame tiltably supported on the supports and extending therebetween with the tilt axis of the roller frame co-axial with the arcuately slotted holes in the supports, locking means carried by each support and riding in each of said arcuately slotted holes for locking the U-shaped frame in tiltably adjusted position, a pair of laterally spaced upwardly diverging guide rollers mounted with their axes in a common plane and extending from an upper portion of each side of the U-shaped roller frame to the lower portion of said frame, and a large net supporting roller mounted transversely of the lower portion of said U-shaped frame and in longitudinally offset relation to the guide rollers, and with its axis parallel to the plane defined by the axes of the guide rollers, whereby with said supports inserted in the sockets in one way the larger roller is located outboard of the guide rollers, and with the supports inserted in the sockets in relatively reversed condition the large roller is located inboard of the guide rollers.

9. A net roller for mounting on the stern of a small boat comprising support means for selective mounting in either of two relatively reversed positions on the stern of a boat, a pair of fixed side plates mounted one on each side of said support means, and a roller assembly pivotally supported on said support means between the fixed side plates, said roller assembly comprising a U-shaped frame, each side of said frame being L-shaped and disposed in a fore and aft plane, the axis of pivotal mounting of the frame being substantially co-incident with its lower portion, the upper end portion of each side of the frame being bent reversely to point downwardly, a pair of upwardly divergent guide rollers journaled in laterally spaced, axially co-planar relation between the downwardly pointing upper end of each side of the U-shaped frame and the transverse lower portion of the frame, a gusset plate mounted in the angle of each L-shaped side of the roller frame adjacent each of said fixed side plates, a net supporting roller of larger diameter than the inclined guide rollers journaled between said gusset plates in longitudinally offset relation to the guide rollers, and means for clamping each fixed side plate in adjusted position to the gusset plate adjacent thereto, thereby securing the roller assembly in tiltably adjusted position on the support means.

References Cited in the file of this patent

UNITED STATES PATENTS

| 1,727,071 | Lovell | Sept. 3, 1929 |

FOREIGN PATENTS

| 20,345 | Great Britain | 1892 |